(12) United States Patent
Han et al.

(10) Patent No.: US 7,419,279 B2
(45) Date of Patent: Sep. 2, 2008

(54) BACKLIGHT ASSEMBLY, LIQUID CRYSTAL DISPLAY APPARATUS HAVING THE SAME AND METHOD OF MANUFACTURING LAMP-FIXING MEMBER

(75) Inventors: Sang-Sun Han, Cheonan-si (KR); Jae-Hwan Chun, Suwon-si (KR); Jong-Ho Won, Suwon-si (KR); Hyun-Chul Jeong, Asan-si (KR); Won-Ju Kim, Yongin-si (KR); Young-Nam Kim, Anseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/555,980

(22) Filed: Nov. 2, 2006

(65) Prior Publication Data

US 2007/0109767 A1    May 17, 2007

(30) Foreign Application Priority Data

Nov. 2, 2005   (KR) ............... 10-2005-0104073
Jan. 21, 2006  (KR) ............... 10-2006-0006580

(51) Int. Cl.
    *F21V 19/00* (2006.01)
(52) U.S. Cl. ............... 362/225; 362/219; 362/561
(58) Field of Classification Search ........... 362/219, 362/222, 223, 224, 225, 561, 249, 235, 247, 362/227, 260
    See application file for complete search history.

(56) References Cited

U.S. PATENT DOCUMENTS

| 2003/0108638 A1* | 6/2003 | Neter et al. ........... 425/547 |
| 2006/0039163 A1* | 2/2006 | Yun ........................ 362/600 |
| 2007/0091584 A1* | 4/2007 | Chang ..................... 362/29 |

FOREIGN PATENT DOCUMENTS

| CN | 2005010100582.1 | * 12/2005 |
| JP | 2004-200163 | 7/2004 |
| KR | 1020020029842 | 4/2002 |

* cited by examiner

*Primary Examiner*—Laura Tso
(74) *Attorney, Agent, or Firm*—Cantor Colburn LLP

(57) ABSTRACT

A backlight assembly includes a receiving container, lamps, a diffusion plate and a lamp-fixing member. The receiving container includes a bottom plate and sidewalls together providing a receiving space. The lamps are arranged substantially parallel to each other on the bottom plate. The diffusion plate is disposed over the lamps. The lamp-fixing member includes a body portion extending substantially perpendicular to the lamps, a buffer protruding upwardly from the body portion, a diffusion plate supporting portion protruding from the buffer to support the diffusion plate and a lamp-fixing portion formed at the body portion to fix the lamps. Therefore, the buffer having elasticity is formed at an area at which the diffusion plate supporting portion is formed, so that rubbing between the diffusion plate and the diffusion plate supporting portion may be reduced.

17 Claims, 7 Drawing Sheets

_BACKLIGHT ASSEMBLY, LIQUID CRYSTAL DISPLAY APPARATUS HAVING THE SAME AND METHOD OF MANUFACTURING LAMP-FIXING MEMBER_

This application claims priority to Korean Patent Application Nos. 10-2005-0104073, filed on Nov. 2, 2005, and 10-2006-0006580 filed on Jan. 21, 2006, and all the benefits accruing there from under 35 U.S.C. § 119, the contents of which in their entirety are herein incorporated by reference.

BACKGROUND OF THE INVENTION

1. Field of the Invention

The present invention relates to a backlight assembly, a liquid crystal display ("LCD") apparatus having the backlight assembly and a method of manufacturing a lamp-fixing member. More particularly, the present invention relates to a backlight assembly having a lamp-fixing member which prevents a diffusion plate from moving to improve display quality, an LCD apparatus having the backlight assembly and a method of manufacturing the lamp-fixing member.

2. Description of the Related Art

Generally, a liquid crystal display ("LCD") apparatus displays an image using liquid crystals. The LCD apparatus is a flat panel display apparatus. The LCD apparatus has various merits compared to other display devices, such as thin thickness, low driving voltage and low power consumption, for example, but is not limited to the foregoing. Therefore, the LCD apparatus has been widely used in various fields.

The LCD apparatus is a non-emissive type display apparatus. Therefore, the LCD apparatus requires a backlight assembly to supply an LCD panel with light.

The backlight assembly includes at least one lamp which generates light. For example, a plurality of cold cathode fluorescent lamps ("CCFL") having a long cylindrical shape may be employed by the backlight assembly as the lamps. According to the position of the at least one lamp, the backlight assembly is classified as either an edge illumination type backlight assembly or a direct illumination type backlight assembly.

In the case of the edge illumination type backlight assembly, one or two lamps are disposed adjacent to the side edge surface of a transparent light-guide plate. The edge illumination type backlight assembly produces multiple reflections of the light using one surface of the light-guide plate, and emits the light to the LCD panel. In the case of the direct illumination type backlight assembly, a plurality of the lamps is disposed under the LCD panel, a diffusion plate is disposed over the lamps, and a reflective plate is disposed under the lamps, so that the direct illumination type backlight assembly respectively diffuses and reflects the light emitted from the lamps. Therefore, the edge illumination type backlight assembly is used for a relatively small-screen LCD apparatus, such as a notebook computer, a monitor, etc. On the other hand, the direct illumination type backlight assembly is used for a large-screen LCD apparatus with high luminance.

In the case of the direct illumination type backlight assembly for use in the large-screen LCD apparatus, a length of the lamps and a size of the diffusion plate are increased. Therefore, the backlight assembly includes a lamp-fixing member which fixes the lamp and supports the diffusion plate.

More specifically, the lamp-fixing member includes a lamp-fixing portion to fix the lamp and a diffusion plate supporting portion to support the diffusion plate. However, when the diffusion plate freely moves due to vibration of the LCD apparatus, the vibration causes rubbing between the diffusion plate and the diffusion plate supporting portion. The rubbing results in rubbed regions on the diffusion plate, thus deteriorating a display quality of the LCD apparatus.

BRIEF SUMMARY OF THE INVENTION

The present invention provides a backlight assembly capable of preventing a diffusion plate from being rubbed with a lamp-fixing member to improve display quality of a liquid crystal display ("LCD") apparatus.

The present invention also provides an LCD apparatus having the above-mentioned backlight assembly.

The present invention also provides a method of manufacturing the lamp-fixing member of the above-mentioned backlight assembly.

In an exemplary embodiment of a backlight assembly according to the present invention, the backlight assembly includes a receiving container, lamps, a diffusion plate and a lamp-fixing member. The receiving container includes a bottom plate and sidewalls, which together provides a receiving space. The lamps are arranged substantially parallel to each other on the bottom plate of the receiving container. The diffusion plate is disposed over the lamps. The lamp-fixing member includes a body portion, a buffer, a diffusion plate supporting portion and a lamp-fixing portion. The body portion extends substantially perpendicular to the lamps. The buffer protrudes upwardly from the body portion. The diffusion plate supporting portion protrudes from the buffer to support the diffusion plate. The lamp-fixing portion is formed at the body portion and fixes the lamps.

A cross-section of the buffer cut along a longitudinal direction of the body portion may have a trapezoid shape. Alternatively, a cross-section of the buffer cut along the longitudinal direction of the body portion may have an arch shape.

In an exemplary embodiment of an LCD apparatus according to the present invention, the LCD apparatus includes a backlight assembly and a display unit. The backlight assembly includes a receiving container, lamps, a diffusion plate and a lamp-fixing member. The receiving container includes a bottom plate and sidewalls, which together provide a receiving space. The lamps are arranged substantially parallel to each other on the bottom plate of the receiving container. The diffusion plate is disposed over the lamps. The lamp-fixing member includes a body portion, a buffer, a diffusion plate supporting portion and a lamp-fixing portion. The body portion extends substantially perpendicular to the lamps. The buffer protrudes upwardly from the body portion. The diffusion plate supporting portion protrudes from the buffer to support the diffusion plate. The lamp-fixing portion is formed at the body portion and fixes the lamps. The display unit includes an LCD panel being disposed over the diffusion plate to display an image, and a driving circuit portion driving the LCD panel.

In an exemplary embodiment of a method of manufacturing a lamp-fixing member according to the present invention, in order to manufacture the lamp-fixing member including a diffusion plate supporting portion to support a diffusion plate, a mold frame is formed by combining a first core, a second core and a third core, wherein the third core has a groove corresponding to an end portion of the diffusion plate supporting portion. Then, a melted resin input inside of the mold frame. Then, after the melted resin is refrigerated inside of the mold frame, the first core, the second core and the third core are separated, respectively.

According to the present invention, the buffer having elasticity is formed at an area at which the diffusion plate supporting portion is formed, so that the rubbing between the diffusion plate and the diffusion plate supporting portion may be reduced and the display quality may be improved.

BRIEF DESCRIPTION OF THE DRAWINGS

The above and other aspects, features and advantages of the present invention will become readily apparent by reference to the following detailed description when considered in conjunction with the accompanying drawings wherein.

DETAILED DESCRIPTION OF THE INVENTION

Figure 1:
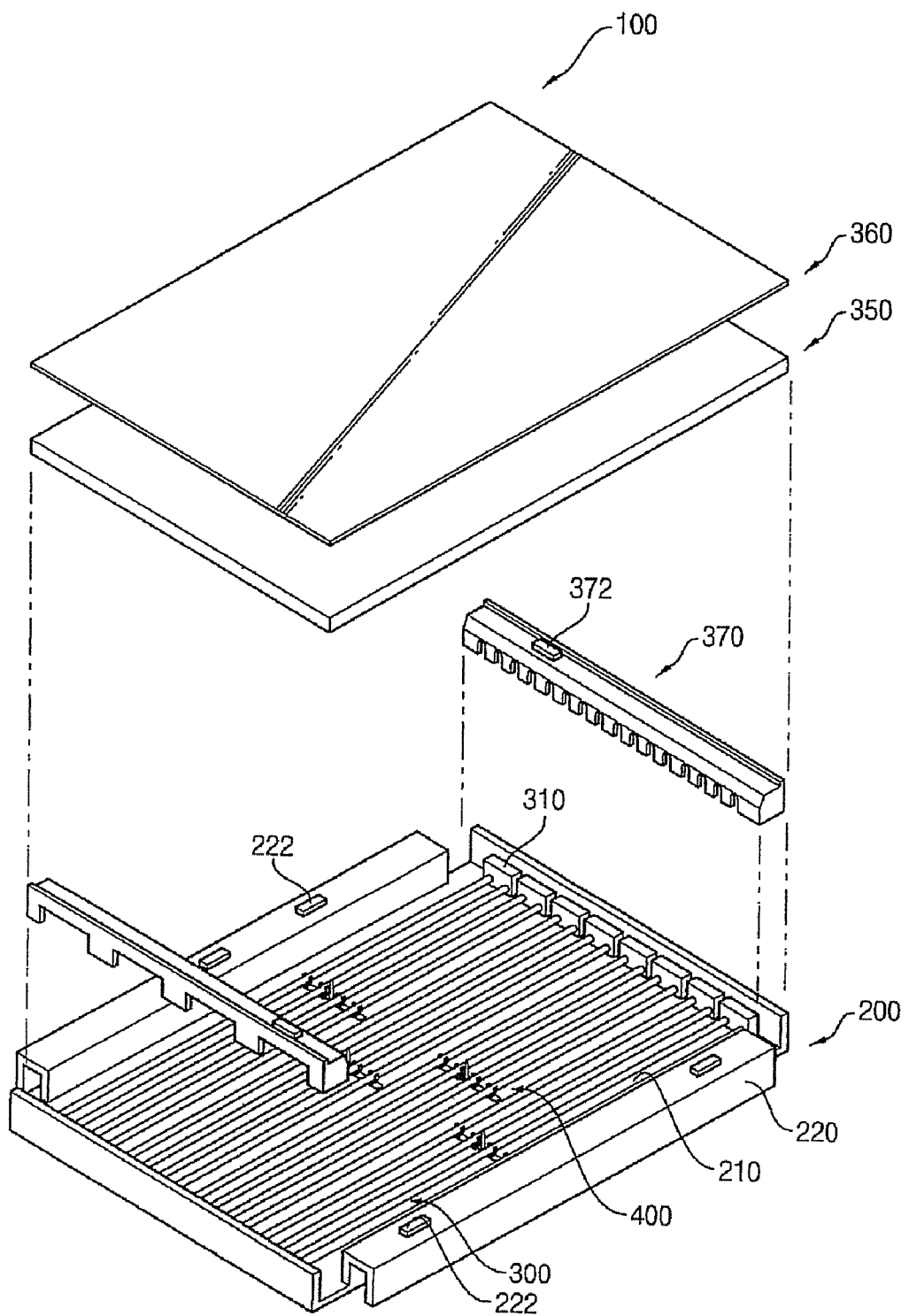
FIG. 1 is an exploded perspective view illustrating a backlight assembly in accordance with an exemplary embodiment of the present invention.

It should be understood that the exemplary embodiments of the present invention described below may be varied modified in many different ways without departing from the inventive principles disclosed herein, and the scope of the present invention is therefore not limited to these particular flowing embodiments. Rather, these exemplary embodiments are provided so that this disclosure will be thorough and complete, and will fully convey the concept of the invention to those skilled in the art by way of example and not of limitation.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the exemplary embodiments of the present invention will be described in more detail with reference to the accompanied drawings.

FIG. 1 is an exploded perspective view illustrating a backlight assembly in accordance with an exemplary embodiment of the present invention.

Referring to FIG. 1, a backlight assembly 100 includes a receiving container 200, a plurality of lamps 300, a diffusion plate 350 and a lamp-fixing member 400.

The receiving container 200 includes a bottom plate 210 and sidewalls 220. The sidewalls 220 respectively extend from peripheral portions of the bottom plate 210, so that the bottom plate 210 and the sidewalls 220 together provide a receiving space. The sidewalls 220 may be integrally formed with the bottom plate 210. The receiving container 200 may include a metal which has high strength and may not be easily deformed.

The backlight assembly 100 may further include a first diffusion plate guiding portion 222 disposed on the sidewalls 220 of the receiving container 200. For example, four of the first diffusion plate guiding portions 222 may be disposed on the sidewalls 220 of the receiving container 200. The first diffusion plate guiding portions 222 guide the diffusion plate 350, to fix the diffusion plate 350 at a predetermined position on the receiving container 200. The first diffusion plate guiding portions 222 may be disposed on two corresponding sidewalls 220 of the receiving container 200 along a direction which is substantially parallel with a longitudinal direction of the lamps 300. The first diffusion plate guiding portions 222 protrude upwardly from the sidewalls 220 of the receiving container 200 so as to properly guide the diffusion plate 350 into the predetermined position on the receiving container 200. As illustrated in FIG. 1, the first diffusion plate guiding portions 222 protrude upwardly from a horizontally disposed upper surface defining the sidewalls 220 of the receiving container 200.

The lamps 300 are disposed on the bottom plate 210 of the receiving container 200 substantially in parallel to one another. The lamps 300 generate the light in response to a driving signal provided from an external device (not shown). A plurality of cold cathode fluorescent lamps ("CCFLs") having a long cylindrical shape may be employed as the lamps 300. Alternatively, a plurality of external electrode fluorescent lamps ("EEFLs"), each EEFL having external electrodes formed at end portions of the EEFL, may be employed as the lamps 300. Also, each of the lamps 300 may have a curved shape, such as a U-shape. Both of the end portions of the lamps 300 are fixed in lamp holders 310 which are disposed on the receiving container 200.

The diffusion plate 350 is disposed over the lamps 300. The diffusion plate 350 diffuses the light provided by the lamps 300 to improve luminance uniformity. The diffusion plate 350 may have a plate shape. Also, the diffusion plate 350 is separated from the lamps 300 by a predetermined distance.

The diffusion plate 350 is formed of an optically transparent material. The diffusion plate 350 may further be formed of a light-diffusing material to diffuse the light. For example, the diffusion plate 350 may be formed of polymethyl methacrylate ("PMMA") as the optically transparent material.

The backlight assembly 100 may further include at least one optical sheet 360 disposed on the diffusion plate 350. The optical sheet 360 changes paths of the light diffused by the diffusion plate 350 to improve optical characteristics. The optical sheet 360 may include a prism sheet to improve front-view luminance by condensing the light in the front direction, which has been diffused by the diffusion plate 350. Also, the optical sheet 360 may include a diffusion sheet to further diffuse the light diffused by the diffusion plate 350. As described above, the backlight assembly 100 may further include various functional optical sheets according to optical characteristics which are required or desired.

The lamp-fixing member 400 is fixed to the bottom plate 210 to fix the lamps 300. When the length of the lamps 300 is increased, the lamps 300 may deform or sag. Therefore, the lamp-fixing member 400 stably supports the middle portion of the lamps 300 and may prevent the deformation and sagging of the lamps 300.

The number of the lamp-fixing members 400 may be determined by the number of the lamps 300. For example, each of the lamp-fixing members 400 may fix four lamps 300, but is not limited thereto.

When the number of the lamp-fixing members 400 is more than one, each lamp-fixing member 400 may be disposed in a zigzag arrangement along a direction which is substantially perpendicular to the longitudinal direction of the lamps 300. When each lamp-fixing member 400 is disposed in one direction, a defect, such as a dark line which may be formed corresponding to the lamp-fixing members 400, may be generated. Therefore, the lamp-fixing members 400 may be disposed in a zigzag arrangement, so that the dark line defect may be prevented.

Each of the lamps 300 is fixed by one lamp-fixing member 400. However, when the lamps 300 are too long, each of the lamps 300 may be fixed by more than one of the lamp-fixing members 400. Each of the lamp-fixing members 400 may be spaced apart from each other by a predetermined distance along the longitudinal direction of the lamps 300. In this case, the lamp-fixing members 400 may be disposed in a zigzag arrangement along the direction which is substantially perpendicular to the longitudinal direction of the lamps 300.

The backlight assembly 100 may further include a side mold 370 which is disposed at an end portion of the lamps 300. The side mold 370 is combined with the receiving container 200 to cover the end portion of the lamps 300. The side mold 370 improves the luminance uniformity by covering the end portion of the lamps 300, which has a relatively lower luminance than other portions of the lamps 300. The side mold 370 supports an edge portion of the diffusion plate 350 disposed on the side mold 370, and guides the diffusion plate 350 into position. The side mold 370 may include a second diffusion plate guiding portion 372 which guides the diffusion plate 350 into position. The second diffusion plate guiding portion 372 protrudes by a predetermined height from an upper surface defining the side mold 370.

The backlight assembly 100 may further include a middle mold (not shown) to fix the diffusion plate 350 and the optical sheet 360 to the receiving container 200. The middle mold is combined with an upper portion of the receiving container 200 to fix the edge portion of the diffusion plate 350 and the optical sheet 360 to the receiving container 200.

Figure 2:
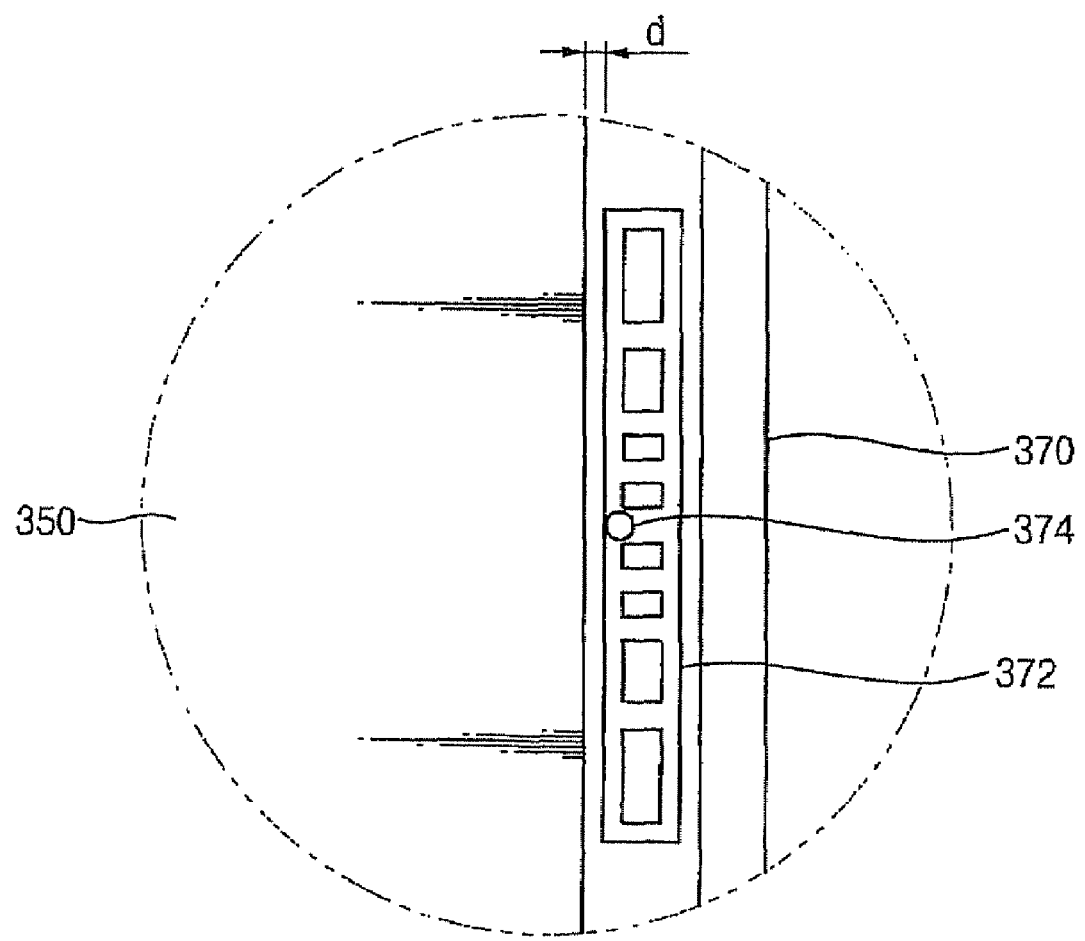
FIG. 2 is an enlarged partial plan view illustrating a diffusion plate received in a receiving container illustrated in FIG. 1.

FIG. 2 is an enlarged partial plan view illustrating the diffusion plate 350 received in the receiving container 200 in FIG. 1.

Referring to FIGS. 1 and 2, the diffusion plate 350 is supported by the receiving container 200 and the side mold 370. Particularly, first sides of the diffusion plate 350, which are substantially parallel with a longitudinal direction of the lamps 300, are supported by the sidewalls 220 of the receiving container 200, and second sides of the diffusion plate 350, which are substantially perpendicular to the first sides, are supported by the side mold 370. Then, the receiving position of the diffusion plate 350 is guided by the first diffusion plate guiding portion 222 of the receiving container 200 and the second diffusion plate guiding portion 372 of the side mold 370.

The diffusion plate 350 may be easily transformed by heat and moisture. Therefore, the diffusion plate 350 is received so as to be separated from the first diffusion plate guiding portion 222 and the second diffusion plate guiding portion 372 by a predetermined distance corresponding to a degree of transformation of the diffusion plate 350. For example, the diffusion plate 350 may be separated from the first diffusion plate guiding portion 222 and the second diffusion plate guiding portion 372 by about 1.5 mm. The second diffusion plate guiding portion 372 may include a sheet-fixing protrusion 374 to fix the optical sheet 360.

Figure 3:
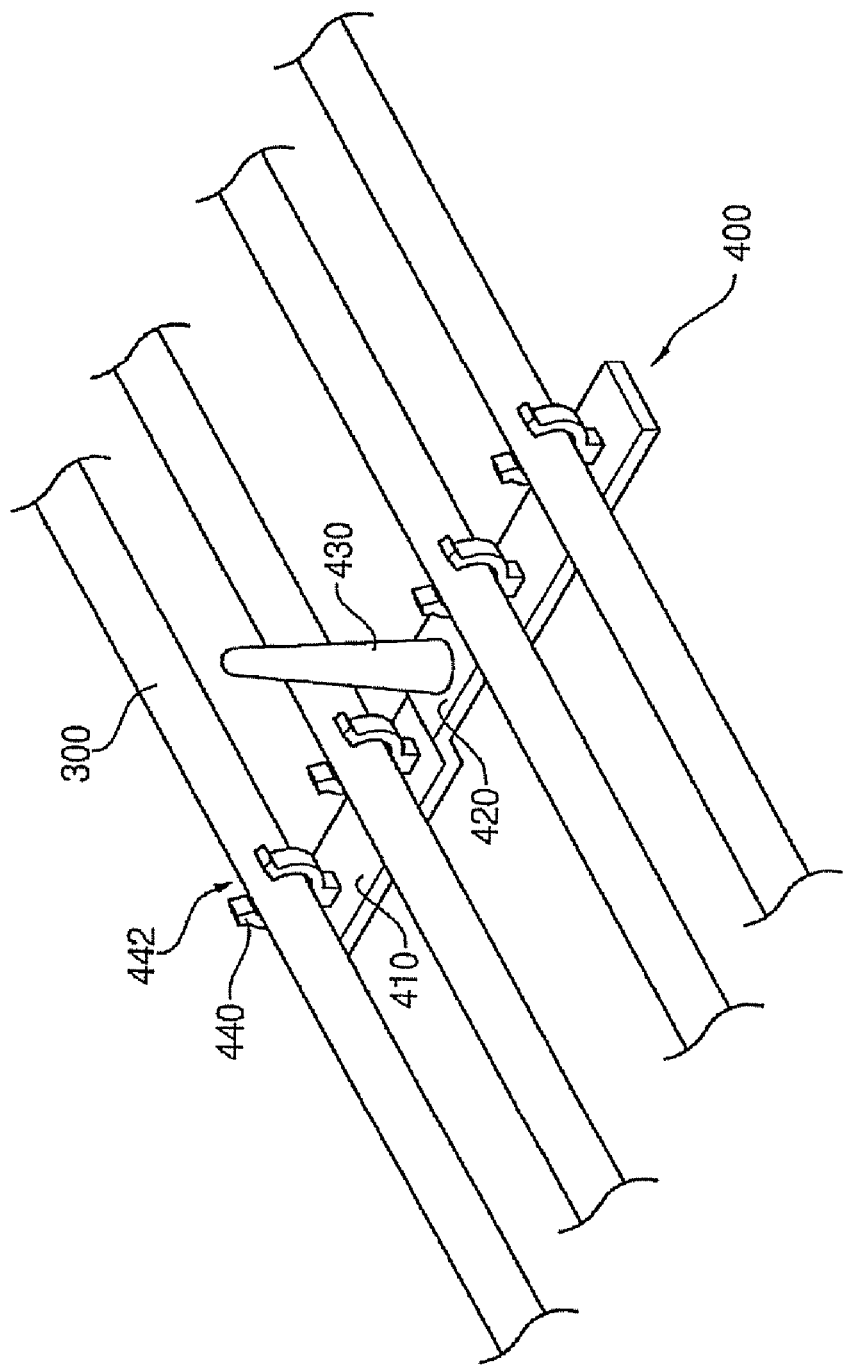
FIG. 3 is a perspective view illustrating a lamp-fixing member illustrated in FIG. 1.
Figure 4:
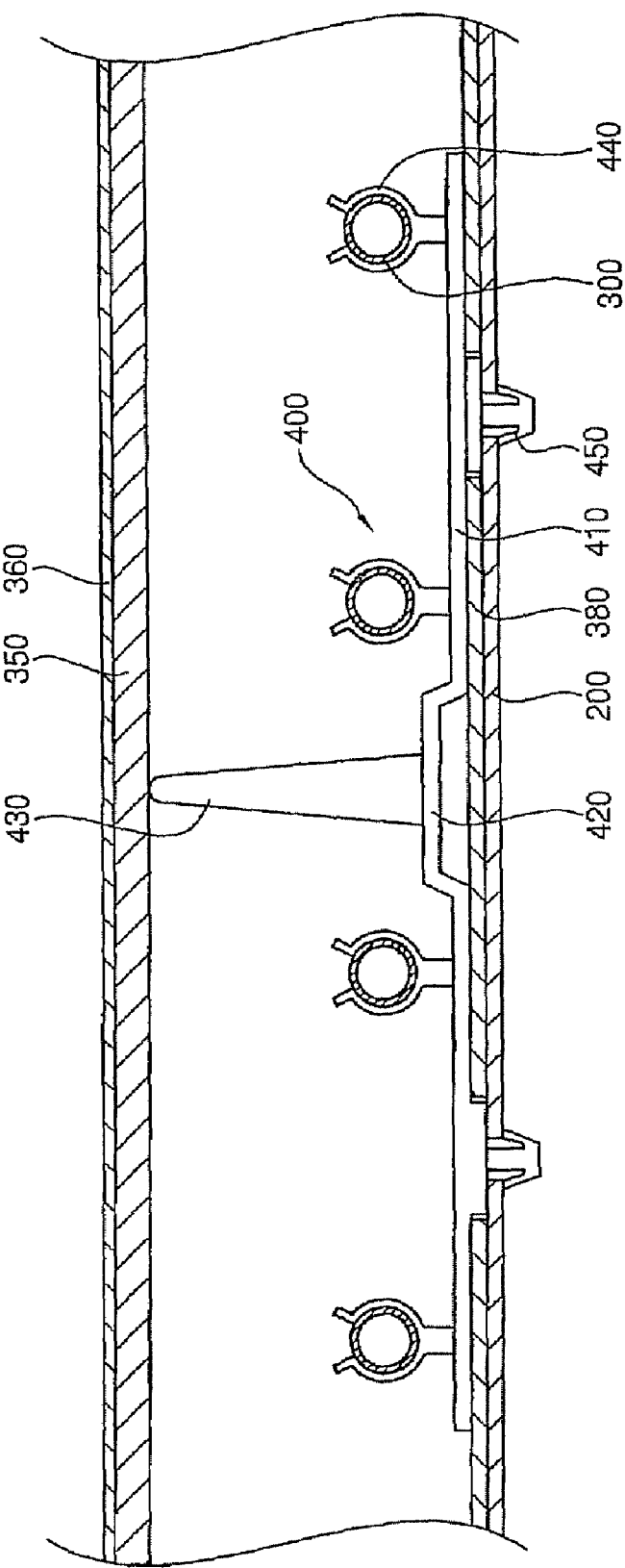
FIG. 4 is a cross-sectional view illustrating the lamp-fixing member in FIG. 3.

FIG. 3 is a perspective view illustrating a lamp-fixing member illustrated in FIG. 1 and FIG. 4 is a cross-sectional view illustrating the lamp-fixing member in FIG. 3.

Referring to FIGS. 3 and 4, the lamp-fixing member 400 includes a body portion 410, a buffer 420, a diffusion plate supporting portion 430 and a lamp-fixing portion 440.

The body portion 410 is formed so as to extend along a direction which is substantially perpendicular to a plurality of the lamps 300. The body portion 410 may be formed so as to be opened or not coplanar at a lower portion corresponding to the buffer 420. Alternatively, the body portion 410 may be integrally formed so as to cover a lower portion of the buffer 420.

The buffer 420 protrudes upwardly from the body portion 410, so as to be not coplanar with the body portion 410. For example, the buffer 420 is formed at a middle portion of the body portion 410. Alternatively, a plurality of the buffers 420 may be formed to be separated by a predetermined distance along a longitudinal direction of the body portion 410.

A shape of the buffer 420 may be adjusted to increase elasticity of the buffer 420. The buffer 420 buffers a force formed by moving and sagging of the diffusion plate 350 against the diffusion plate supporting portion 430 when the diffusion plate 350 is received in the receiving container 200. A cross-section of the buffer 420 cut along a longitudinal direction of the body portion 410 may have substantially a trapezoid shape, as illustrated in FIG. 4. In other words, the buffer 420 includes inclined sides relative and joined to the body portion 410.

The diffusion plate supporting portion 430 may protrude from the buffer 420 to support the diffusion plate 350. A height of the diffusion plate supporting portion 430 may be larger than that of the lamp-fixing portion 440. The larger the diffusion plate 350 is, the lower the middle portion of the diffusion plate 350 sags. Therefore, the diffusion plate supporting portion 430 may prevent the sagging of the diffusion plate 350. Also, the diffusion plate supporting portion 430 maintains the distance between the diffusion plate 350 and the lamps 300 which are fixed by the lamp-fixing portion 440. For example, the diffusion plate supporting portion 430 may have a cone shape, as illustrated. Accordingly, when the rubbing between the diffusion plate 350 and the diffusion plate supporting portion 430 is produced by the moving of the diffusion plate 350, the rubbing may be minimized by the elasticity of the buffer 420.

The lamp-fixing portion 440 is formed on the upper-surface of the body portion 410, and supports the lamps 300. The lamp-fixing portion 440 protrudes upwardly from the body portion 410. The lamp-fixing portion 440 may have an opening portion 442 so that the lamps 300 may be inserted into the opening portion 442.

A width of the opening portion 442 is determined by a diameter of the lamps 300. The larger the width of the opening portion 442 is, the easier each of the lamps 300 may be inserted into the lamp-fixing portion 440. However, when the width of the opening is too large, each of the lamps 300 may be easily separated from the lamp-fixing portion 440. Therefore, the width of the opening portion 442 desirably may have a range of from about 80% to about 90% of the diameter of the lamps 300. For example, when the diameter of the lamps 300 is about 4 mm, the width of the opening portion 442 may be about 3.3 mm.

A plurality of lamp-fixing portions 440 may be respectively formed at both sides of the buffer 420. For example, the lamp-fixing member 400 includes four lamp-fixing portions 440 (two on either side of the buffer 420). Alternatively, the lamp-fixing member 400 may include various numbers of the lamp-fixing portions 440.

The lamp-fixing member 400 may further include at least one combining portion 450 to be combined with the receiving container 200. The combining portion 450 may be formed at the bottom surface of the body portion 410. The position and the number of the combining portions 450 may be changed.

The backlight assembly 100 may further include a reflective plate 380 disposed between the receiving container 200 and the lamps 300. The reflective plate 380 reflects light provided by the lamps 300 to the diffusion plate 380, so that the reflective plate 380 may improve efficiency of the light. The reflective plate 380, for example, is fixed to the bottom plate 210 of the receiving container 200.

The reflective plate 380 and the bottom plate 210 of the receiving container 200 have openings corresponding to the combining portion 450 of the lamp-fixing member 400. The combining portion 450 penetrates through the openings of the reflective plate 380 and the bottom plate 210, and is hooked with the bottom plate 210.

Figure 5:
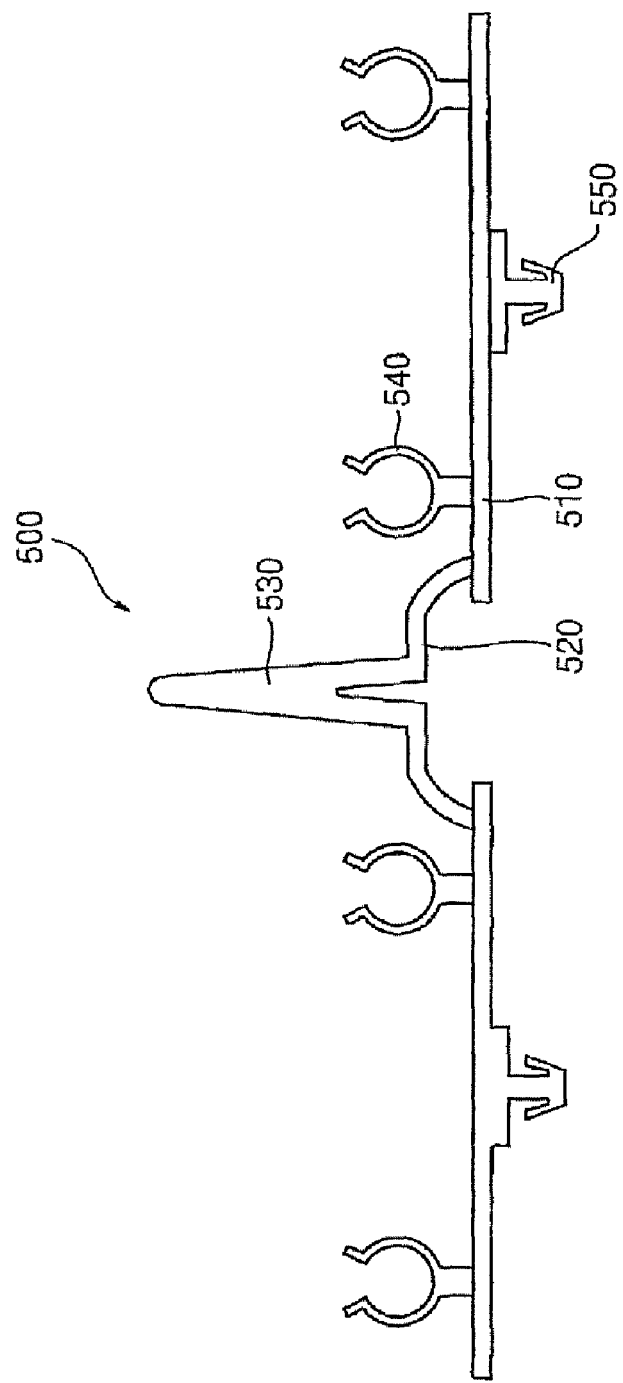
FIG. 5 is a cross-sectional view illustrating a lamp-fixing member in accordance with another exemplary embodiment of the present invention.

FIG. 5 is an exploded perspective view illustrating a lamp-fixing member in accordance with another exemplary embodiment of the present invention.

Referring to FIG. 5, a lamp-fixing member 500 includes a body portion 510, a buffer 520, a diffusion plate supporting portion 530, a lamp-fixing portion 540 and a combining portion 550. The lamp-fixing member 500 is substantially the same as the lamp-fixing member in FIG. 4 except for the buffer 520, and any further explanations of the rest of the structure will be omitted.

The buffer 520 protrudes upwardly from the body portion 510. For example, one buffer 520 is formed at a middle portion of the body portion 510. Alternatively, a plurality of the buffers 520 may be formed so as to be separated by a predetermined distance along a longitudinal direction of the body portion 510.

The buffer 520 may have an elastic shape to buffer a force applied to the diffusion plate supporting portion 530, which force is formed by moving and sagging of the diffusion plate 350. For example, a cross-section of the buffer cut along a longitudinal direction of the body portion may have a substantially arch shape. Also, the diffusion plate supporting portion 530 may have an empty structure to improve elasticity. For example, the diffusion plate supporting portion 530 may define a cavity or be cut out to improve elasticity.

Figure 6:
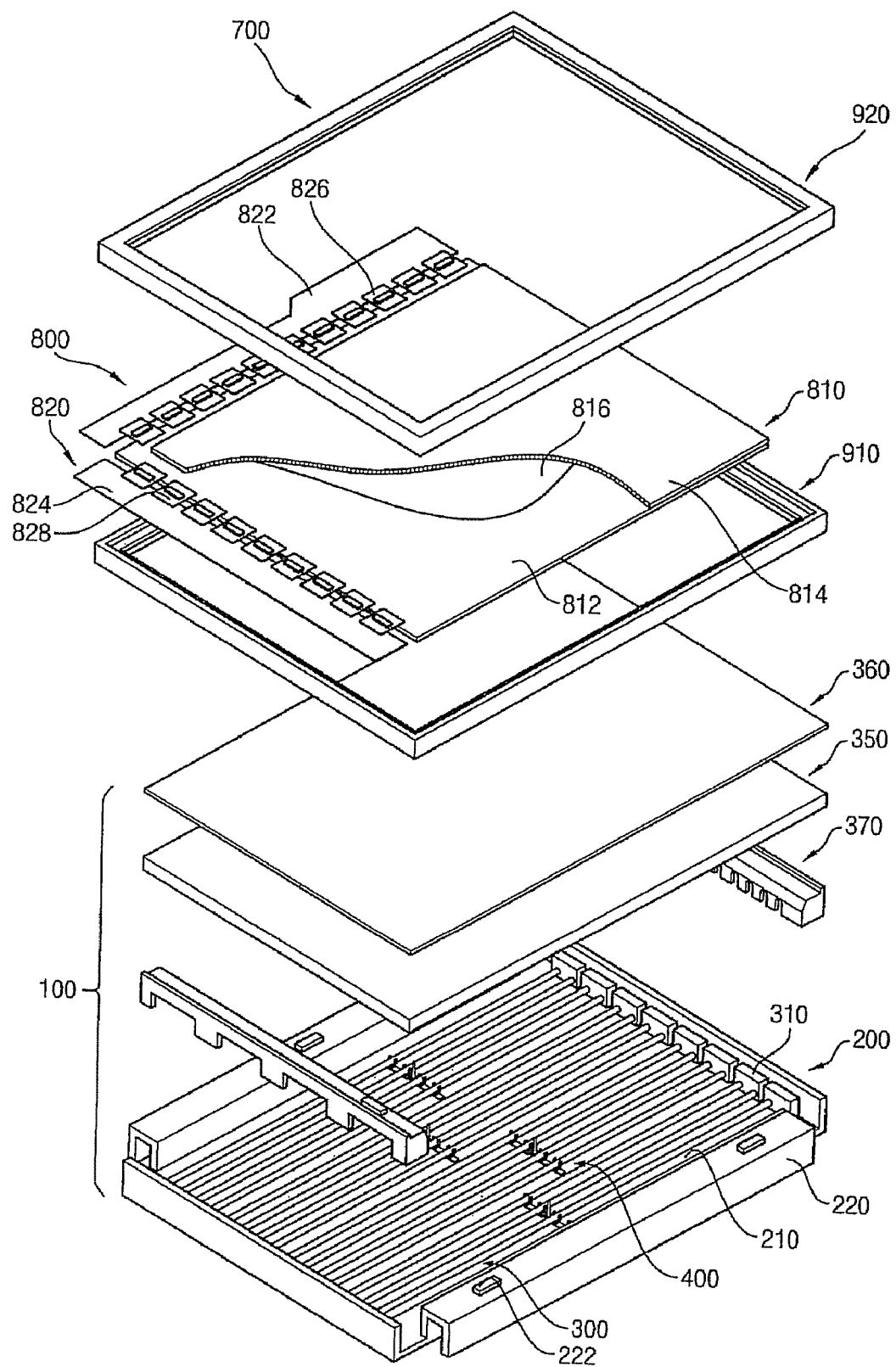
FIG. 6 an exploded perspective view illustrating a liquid crystal display ("LCD") apparatus in accordance with an exemplary embodiment of the present invention.

FIG. 6 an exploded perspective view illustrating an LCD apparatus in accordance with an exemplary embodiment of the present invention.

Referring to FIG. 6, an LCD apparatus 700 in accordance with an exemplary embodiment of the present invention includes a backlight assembly 100 supplying light and a display unit 800 displaying an image.

The backlight assembly 100 of the present exemplary embodiment is substantially the same as the backlight assembly in FIGS. 1 to 5. Thus, the same reference numerals will be used to refer to the same or like parts as those described in the above-explained embodiment, and any further explanations will be omitted.

The display unit 800 includes a liquid crystal display ("LCD") panel 810 and a driving circuit portion 820. The LCD panel 810 displays the image by using the light provided by the backlight assembly 100. The driving circuit portion 820 drives the LCD panel 810.

The LCD panel 810 includes a first substrate 812, a second substrate 814 and a liquid crystal layer 816. The second substrate 814 is combined with the first substrate 812 so that the second substrate 814 faces the first substrate 812. The liquid crystal layer 816 is disposed between the first and second substrates 812 and 814.

The first substrate 812 includes a plurality of thin-film transistors (not shown) arranged in a matrix shape. For example, the first substrate 812 may include glass. A gate electrode of each of the TFTs is electrically connected to one of the gate lines (not shown) on the glass substrate 812. A source electrode of each of the TFTs is electrically connected to one of the data lines (not shown) on the glass substrate 812. A drain electrode of each of the TFTs is electrically connected to a pixel electrode (not shown) that includes an optically transparent and electrically conductive material.

The second substrate 814 may be a color filter substrate which includes red, green and blue color filters to display color. For example, the second substrate 814 may include glass. The second substrate 814 may further include a common electrode which includes an optically transparent and electrically conductive material.

When gate and data signals are applied to the gate and source electrodes, respectively, of each of the TFTs, the TFTs are turned on to generate an electric field between the pixel electrode and the common electrode. An arrangement of liquid crystal molecules of the liquid crystal layer 816 is changed in response to the electric field applied thereto, and thus a light transmittance of the liquid crystal layer 816 is changed to display the image.

The driving circuit portion 820 includes a data printed circuit board ("PCB") 822, a gate PCB 824, a data driving circuit film 826 and a gate driving circuit film 828. The data PCB 822 applies a data driving signal to the LCD panel 810. The gate PCB 824 applies a gate signal to the LCD panel 810. The data PCB 822 is electrically connected to the LCD panel 810 through the data driving circuit film 826. The gate PCB 824 is electrically connected to the LCD panel 810 through the gate driving circuit film 828.

Each of the data and gate driving circuit films 826 and 828 may include a driving chip. For example, each of the data and gate driving circuit films 826 and 828 may include a tape carrier package ("TCP"), a chip-on-film ("COF"), etc.

The data driving circuit film 826 is bent toward a lower surface of a receiving container 200 along a side surface of the receiving container 200, so that the data PCB 822 is disposed on the side surface and the lower surface of the receiving container 200. The gate PCB 824 is bent toward the lower surface of the receiving container 200, so that the gate PCB is disposed on the side surface and the lower surface of the receiving container 200. An auxiliary signal line may be formed on the LCD panel 810 and the gate flexible circuit film 828, so that the gate PCB 824 may be omitted.

The LCD apparatus 700 may further include a middle mold 910. The middle mold 910 is disposed between an optical sheet 360 and the LCD panel 810. The middle mold 910 fixes the optical sheet 360 and a diffusion plate 350 to the receiving container 200, and supports the LCD panel 810. The middle mold 910 may be one piece having a frame shape. Alternatively, the middle mold 910 may be divided into two pieces, and each of the pieces may have a U-shape. Alternatively, the middle mold 910 may be divided into three or four pieces, and each of the pieces may have an L-shape.

The LCD apparatus 700 may further include a top chassis 920 to fix the display unit 800 to the middle mold 910. The top chassis 920 covers an edge portion of the LCD panel 810, and is combined with the receiving container 200 to fix the LCD panel 810 to the middle mold 910. The top chassis 920 protects the LCD panel 910 from external impacts. Also, the top chassis 920 may prevent the LCD panel 810 from being separated from the middle mold 910. The top chassis 920 may have one piece having the frame shape. Alternatively, the top chassis 920 may be divided into two pieces, and each of the pieces may have a U-shape. Alternatively, the top chassis 920 may be divided into three or four pieces, and each of the pieces may have an L-shape.

Figure 7:
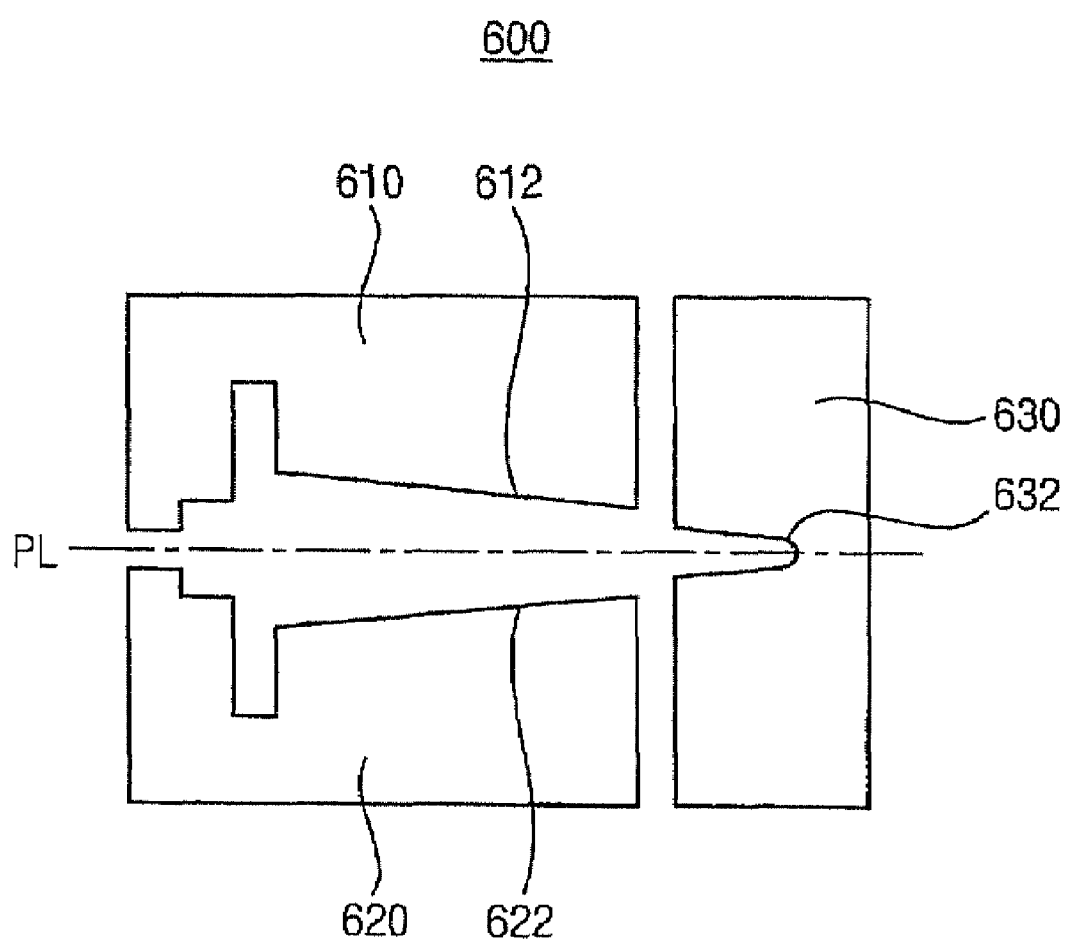
FIG. 7 is a cross-sectional view illustrating a mold frame for manufacturing a lamp-fixing member in accordance with an exemplary embodiment of the present invention.

FIG. 7 is a cross-sectional view illustrating a mold frame for manufacturing a lamp-fixing member in accordance with an exemplary embodiment of the present invention.

Referring to FIGS. 4 and 7, the lamp-fixing member 400 includes a diffusion plate supporting portion 430, and the mold frame 600 is formed by combining with a first core 610, a second core 620 and a third core 630.

The first core 610 may be disposed at an upper portion of the mold frame 600. The second core 620 may be disposed at a bottom portion of the mold frame 600. The third core 630 may be arranged in a direction substantially perpendicular to the first core 610 and the second core 620.

The first core 610 may have a first groove 612 corresponding to a first half of the body portion 410, the buffer 420, the diffusion plate supporting portion 430, the lamp-fixing portion 440 and the combining portion 450 of the lamp-fixing member 400. The second core 620 may have a second groove 622 corresponding to a second half of the body portion 410, the buffer 420, the diffusion plate supporting portion 430, the lamp-fixing portion 440 and the combining portion 450 of the lamp-fixing member 400. The second half of the body portion 410 is opposite to the first half of the body portion 410. The third core 630 may have a third groove 632 corresponding to an end portion of the diffusion plate supporting portion 430. A groove corresponding to the lamp-fixing member 400 may be formed inside of the mold frame 600 by combining the first core 610, the second core 620 and the third core 630.

When the mold frame is formed by only two cores, a partition line is formed along a center line of the diffusion plate supporting portion 430 having a cone shape. Accordingly, a micro-burr may be formed at the end portion of the diffusion plate supporting portion 430 in contact with the diffusion plate 350. Thus, the diffusion plate 350 may be cracked by the burr, which may be a cause of a defect of the LCD apparatus. However, in FIG. 7, the first core 610, the second 620 and the third core 630 having the third groove 632, corresponding to the end portion of the diffusion plate supporting portion 430, are used to manufacture the lamp-fixing member 400 so that the micro-burr is absent on the end portion of the diffusion plate supporting portion 430 in contact with the diffusion plate 350.

In order to manufacture the lamp-fixing member 400, the mold frame 600 is formed by combining the first core 610, the second core 620 and the third core 630. Then, a melted resin is put inside of the mold frame 600. For example, the melted resin put inside of the mold frame 600 through an inserting portion (not shown) which is formed at one side of the mold frame 600.

Then, the melted resin inside of the mold frame 600 is refrigerated. Then, the lamp-fixing member 400 is completed by separating the first core 610, the second core 620 and the third core 630.

According to the present invention, a buffer having elasticity is formed at an area at which a diffusion plate supporting portion of a lamp-fixing member is formed. Therefore, rubbing between a diffusion plate and the diffusion plate supporting portion may be minimized, so that a crack of the diffusion plate may be prevented and the display quality may be improved.

Also, a mold frame for manufacturing a lamp-fixing member may include a core having a groove corresponding to an end portion of the diffusion plate supporting portion, so that a micro-burr which may be formed at the end portion of the diffusion plate supporting portion may be prevented and a crack of the diffusion plate may be prevented from being generated.

The present invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A backlight assembly comprising:
    a receiving container including a bottom plate and sidewalls, the bottom plate and sidewalls together providing a receiving space;
    a plurality of lamps arranged substantially in parallel with each other on the bottom plate of the receiving container;
    a diffusion plate disposed over the lamps; and
    a lamp-fixing member including:
        a body portion extending substantially perpendicular to the lamps;
        a buffer protruding upwardly from the body portion;
        a diffusion plate supporting portion protruding from the buffer to support the diffusion plate; and
        a lamp-fixing portion being formed at the body portion and fixing the lamps.

2. The backlight assembly of claim 1, wherein a cross-section of the buffer cut along a longitudinal direction of the body portion has a trapezoid shape.

3. The backlight assembly of claim 1, wherein a cross-section of the buffer cut along a longitudinal direction of the body portion has an arch shape.

4. The backlight assembly of claim 1, wherein the buffer is formed at a middle portion of the body portion.

5. The backlight assembly of claim 1, wherein the body portion is opened at a lower portion corresponding to the buffer.

6. The backlight assembly of claim 1, wherein the diffusion plate supporting portion has a cone shape.

7. The backlight assembly of claim 1, wherein the lamp-fixing portion protrudes upwardly from the body portion and has an opening portion into which the lamp is inserted.

8. The backlight assembly of claim 7, further comprising a plurality of lamp fixing portions respectively disposed at both sides of the buffer.

9. The backlight assembly of claim 1, wherein the lamp-fixing member further comprises a combining portion being formed at a bottom surface of the body portion to be combined with the bottom plate of the receiving container.

10. The backlight assembly of claim 1, wherein each of a plurality of lamp-fixing members is disposed in a zigzag arrangement relative to the lamp-fixing members along a direction which is substantially perpendicular to a longitudinal direction of the lamps.

11. A liquid crystal display (LCD) apparatus comprising:
    a backlight assembly including:
        a receiving container;
        a plurality of lamps arranged substantially in parallel with each other on a bottom plate of the receiving container;
        a diffusion plate being disposed over the lamps; and
        a lamp-fixing member including:
            a body portion extending substantially perpendicular to the lamps;
            a buffer protruding upwardly from the body portion;
            a diffusion plate supporting portion protruding from the buffer to support the diffusion plate; and
            a lamp-fixing portion being formed at the body portion and fixing the lamps; and
    a display unit including an LCD panel being disposed over the diffusion plate to display an image, and a driving circuit portion driving the LCD panel.

12. The LCD apparatus of claim 11, wherein the buffer protrudes in a trapezoid shape or an arch shape relative to a plane of the body portion so as to have a predetermined elasticity.

13. The LCD apparatus of claim 11, wherein the buffer is formed at a middle portion of the body portion and the body portion is opened at a lower portion corresponding to the buffer.

14. The LCD apparatus of claim 11, further comprising a plurality of the lamp-fixing portions respectively disposed at both sides of the buffer, and wherein each of the lamp-fixing portions has an opening portion into which the lamp is inserted.

15. The LCD apparatus of claim 11, wherein the backlight assembly further comprises:
    a reflective plate disposed under the lamps; and
    an optical sheet disposed over the diffusion plate.

16. A method of manufacturing a lamp-fixing member including a diffusion plate supporting portion to support a diffusion plate, the method comprising:
    forming a mold frame by combining a first core, a second core and a third core, wherein the third core has a groove corresponding to an end portion of the diffusion plate supporting portion;
    inputting a melted resin inside of the mold frame;
    refrigerating the melted resin inside of the mold frame; and
    separating the first core, the second core and the third core, respectively;
    wherein the lamp-fixing member comprises:
    a body portion;
    a buffer protruding upwardly from the body portion;
    a diffusion plate supporting portion protruding from the buffer to support the diffusion plate; and
    a lamp-fixing portion being formed at the body portion for fixing a lamp.

17. The method of claim 16, wherein the first core has a first groove corresponding to a first half of the body portion, the buffer, the diffusion plate supporting portion and the lamp-fixing portion, and the second core has a second groove corresponding to a second half of the body portion, the buffer, the diffusion plate supporting portion and the lamp-fixing portion, wherein the second half is opposite to the first half.

* * * * *